United States Patent
Clarkson et al.

(10) Patent No.: US 11,163,774 B2
(45) Date of Patent: *Nov. 2, 2021

(54) LOWER-DIMENSIONAL SUBSPACE APPROXIMATION OF A DATASET

(71) Applicant: INTERNATIONAL BUSINESS MACHINES CORPORATION, Armonk, NY (US)

(72) Inventors: Kenneth L. Clarkson, Madison, NJ (US); David P. Woodruff, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 16/403,650

(22) Filed: May 6, 2019

(65) Prior Publication Data
US 2019/0258640 A1    Aug. 22, 2019

Related U.S. Application Data

(63) Continuation of application No. 15/295,388, filed on Oct. 17, 2016, now Pat. No. 10,346,405.

(51) Int. Cl.
*G06F 16/2455*    (2019.01)
*G06F 16/35*    (2019.01)
*G06F 16/33*    (2019.01)

(52) U.S. Cl.
CPC ...... *G06F 16/24561* (2019.01); *G06F 16/334* (2019.01); *G06F 16/35* (2019.01)

(58) Field of Classification Search
CPC ...... G06F 16/313; G06F 16/951; G06F 40/30; G06F 16/35; G06F 16/93; G06F 17/16; G06F 16/316; G06F 16/90344
See application file for complete search history.

(56) References Cited

U.S. PATENT DOCUMENTS 5,347,286 A    9/1994    Babitch
5,468,069 A    11/1995    Prasanna et al.
(Continued)

OTHER PUBLICATIONS

Feldman, 2014, "A Uniform Framework for Approximate and Clustering Data",accessed on URL—http://arxiv.org/abs/1106.1379 ; 79 pages.

(Continued)

*Primary Examiner* — Angelica Ruiz
(74) *Attorney, Agent, or Firm* — Cantor Colburn LLP; Randall Bluestone (57) ABSTRACT

A lower-dimensional representation (e.g., approximation) of a dataset is determined. The lower-dimensional representation can be used, for example, to perform semantic document analysis. Given a matrix of input data points, where each entry of the matrix indicates a number of times a particular term in a set of terms appears in a particular document in a set of documents, a lower-dimensional compressed matrix is obtained from the matrix by sampling rows of the matrix based on a target rank parameter, a desired accuracy tolerance, leverage scores calculated for the rows, and/or distances from rows of the matrix to a span of the initial set of sampled rows. The compressed matrix is used to determine a similarity metric indicative of a degree of similarity between documents. The documents can then be classified into a same document cluster or different clusters based on whether the similarity metric satisfied a threshold value.

20 Claims, 4 Drawing Sheets

(56) References Cited

U.S. PATENT DOCUMENTS

| | | | |
|---|---|---|---|
| 6,128,417 | A | 10/2000 | Ausbeck, Jr. |
| 7,167,578 | B2 | 1/2007 | Blake et al. |
| 7,216,129 | B2 | 5/2007 | Aono et al. |
| 7,251,637 | B1 * | 7/2007 | Caid .................... G06K 9/4623 706/15 |
| 7,277,893 | B2 | 10/2007 | Aggarwal |
| 7,765,098 | B2 | 7/2010 | Bradford |
| 8,917,789 | B2 | 12/2014 | Khojastepour |
| 9,043,250 | B2 | 5/2015 | Ling et al. |
| 2001/0044719 | A1 | 11/2001 | Casey |
| 2006/0026175 | A1 | 2/2006 | Aggarwal |
| 2006/0224584 | A1 | 10/2006 | Price |
| 2014/0201126 | A1 | 7/2014 | Zadeh et al. |
| 2014/0229158 | A1 * | 8/2014 | Zweig .................... G06N 3/08 704/9 |
| 2014/0244264 | A1 | 8/2014 | Thirumalainambi et al. |
| 2014/0278379 | A1 | 9/2014 | Coccaro et al. |
| 2016/0012057 | A1 | 1/2016 | Franceschini et al. |
| 2016/0012119 | A1 | 1/2016 | Franceschini et al. |
| 2018/0107716 | A1 | 4/2018 | Clarkson et al. |

OTHER PUBLICATIONS

IBM "List of IBM Patents or Patent Applications Treated As Related (Appendix P)"; filed May 6, 2019, 2 pages.

Ipsen et al., "The Effect of Coherence on Sampling From Matrices With Orthonormal Columns, and Preconditioned Least Squares Problems", accessed on URL http:// arxiv.1023.4809v3[math.NA]; 33 pages.

Nelson, et al., "OSNAP: Faster numerical linear algorithms via sparser subspace embeddings", published in the proceedings of the 2013 IEEE 54th Annual Symposium on Foundations of Computer Science, pp. 117-126.

Shyamalkumar et al., "Efficient Subspace Approximation Algorithms", University of Iowa, 2006, URL—http://homepage.cs.uiowa.edu/~kvaradar/paps/kflat06.pdf; 14 pgs.

Woodruff et al, "Low rank approximation and regression in input sparsity time", accessed on URL http://web.stanford.edu/group/mmds/slides2012/s-woodruff.pdf 27 pages.

* cited by examiner

LOWER-DIMENSIONAL SUBSPACE APPROXIMATION OF A DATASET

DOMESTIC PRIORITY

This application is a continuation of U.S. patent application Ser. No. 15/295,388, filed Oct. 17, 2016, the disclosure of which is incorporated by reference herein in its entirety.

BACKGROUND

Singular value decomposition (SVD) is a technique that can be used to obtain a lower-dimensional approximation of a dataset. More specifically, given a set of data points, an SVD seeks to find a representation of the data points (i.e., a lower-dimensional subspace) that minimizes the average squared distance between the data points and their lower-dimensional representations. There are, however, a number of drawbacks associated with conventional techniques for SVD, technical solutions to which are described herein.

SUMMARY

In one or more example embodiments of the disclosure, a method for performing semantic document analysis is disclosed. The method includes determining a semantic analysis matrix corresponding to a set of documents, where each entry of the semantic analysis matrix indicates a number of times a respective term of a set of terms appears in a corresponding document in the set of documents, and then determining a lower-dimensional compressed matrix from the semantic analysis matrix. The method further includes determining a first vector representation of a first document and a second vector representation of a second document, and determining a first lower-dimensional vector representation of the first document using the first vector representation and the lower-dimensional compressed matrix and a second lower-dimensional vector representation of the second document using the second vector representation and the lower-dimensional compressed matrix. The method additionally includes determining, using the first lower-dimensional vector representation and the second lower-dimensional vector representation, a similarity metric associated with the first document and the second document, determining that the similarity metric satisfies a threshold value, and classifying the first document and the second document in a same document cluster.

In one or more other example embodiments of the disclosure, a system for performing semantic document analysis is disclosed. The system includes at least one memory storing computer-executable instructions and at least one processor configured to access the at least one memory and execute the computer-executable instructions to perform a set of operations. The operations include determining a semantic analysis matrix corresponding to a set of documents, where each entry of the semantic analysis matrix indicates a number of times a respective term of a set of terms appears in a corresponding document in the set of documents, and then determining a lower-dimensional compressed matrix from the semantic analysis matrix. The operations further include determining a first vector representation of a first document and a second vector representation of a second document, and determining a first lower-dimensional vector representation of the first document using the first vector representation and the lower-dimensional compressed matrix and a second lower-dimensional vector representation of the second document using the second vector representation and the lower-dimensional compressed matrix. The operations additionally include determining, using the first lower-dimensional vector representation and the second lower-dimensional vector representation, a similarity metric associated with the first document and the second document, determining that the similarity metric satisfies a threshold value, and classifying the first document and the second document in a same document cluster.

In one or more other example embodiments of the disclosure, a computer program product for performing semantic document analysis is disclosed. The computer program product includes a non-transitory storage medium readable by a processing circuit, the storage medium storing instructions executable by the processing circuit to cause a method to be performed. The method includes determining a semantic analysis matrix corresponding to a set of documents, where each entry of the semantic analysis matrix indicates a number of times a respective term of a set of terms appears in a corresponding document in the set of documents, and then determining a lower-dimensional compressed matrix from the semantic analysis matrix. The method further includes determining a first vector representation of a first document and a second vector representation of a second document, and determining a first lower-dimensional vector representation of the first document using the first vector representation and the lower-dimensional compressed matrix and a second lower-dimensional vector representation of the second document using the second vector representation and the lower-dimensional compressed matrix. The method additionally includes determining, using the first lower-dimensional vector representation and the second lower-dimensional vector representation, a similarity metric associated with the first document and the second document, determining that the similarity metric satisfies a threshold value, and classifying the first document and the second document in a same document cluster.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for determining a lower-dimensional representation (e.g., approximation) of a dataset. The lower-dimensional representation may be a lower-dimensional subspace of the dataset. The lower-dimensional representation may be obtained by sampling input data points of the dataset and may approximate the dataset to within a tunable accuracy tolerance. The dataset may be represented as a matrix of n data points in a d-dimensional space. Leverage scores may be determined for the rows of the matrix, and a first subset of the rows may be sampled based on a target rank parameter k, an accuracy tolerance, and the leverage scores. The rows of the matrix may then be projected onto a span of the first subset to obtain a set of projections, and the rows of the matrix may again be sampled based on the target rank parameter k, the accuracy tolerance, and the set of projections to obtain a second subset of rows of the matrix. An optimal k-dimensional subspace may then be determined from the sampled rows of the first subset and the second subset. The k-dimensional subspace may be a lower-dimensional compressed matrix corresponding to the initial matrix.

Conventional SVD techniques aim to identify a lower-dimensional subspace representation of a dataset that minimizes the average squared distance between the data points of the dataset and their lower-dimensional representation. While conventional SVD techniques can be used to identify a lower-dimensional representation of a dataset, they suffer from a number of drawbacks. In particular, conventional SVD techniques suffer from performance issues because their runtime is proportional to the product of the number of input data points and their dimension. Example embodiments of the disclosure provide increased performance over conventional SVD techniques by providing a runtime that is instead proportional to the number of non-zero entries in the input data points. Such performance benefits are further enhanced as the sparsity of the input dataset increases.

A lower-dimensional representation of a dataset obtained in accordance with example embodiments of the disclosure can be used in connection with any application for which a conventional SVD may be used including, without limitation, latent semantic analysis (e.g., semantic document analysis), efficient data storage, de-noising of data, and so forth. Because example embodiments of the disclosure are able to generate the lower-dimensional representation with more performance efficiency, an increased amount of time is available for utilizing the lower-dimensional representation in connection with any particular application as compared to a conventional SVD which, as noted above, has a significantly lower performance runtime. For example, lower-dimensional representations generated in accordance with example embodiments of the disclosure may permit more heuristics or the like to be executed within a given time period, thereby producing results within a desired error guarantee.

Figure 1:
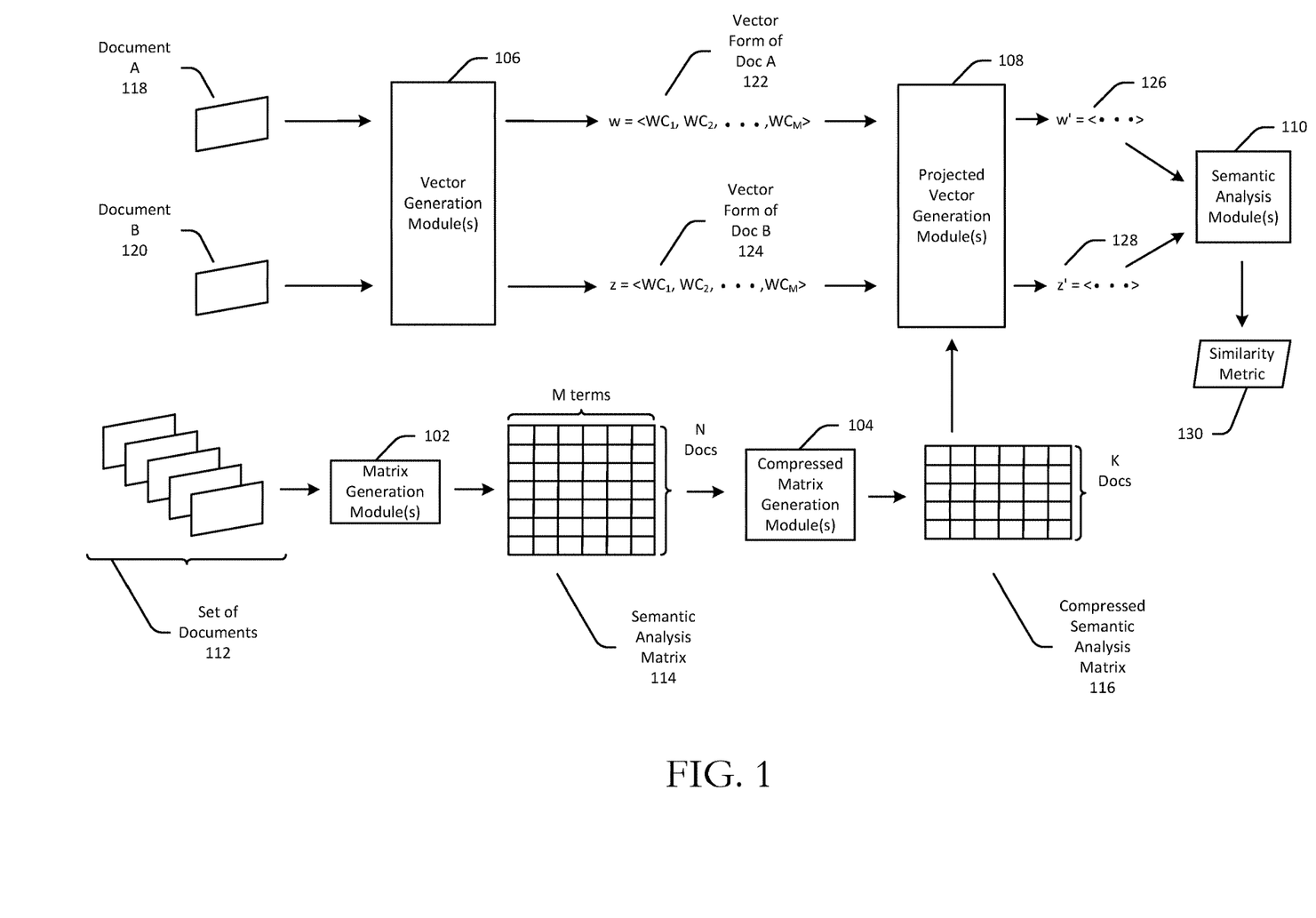
FIG. 1 is a block diagram schematically depicting a semantic document analysis process in accordance with one or more example embodiments of the disclosure.
Figure 2:
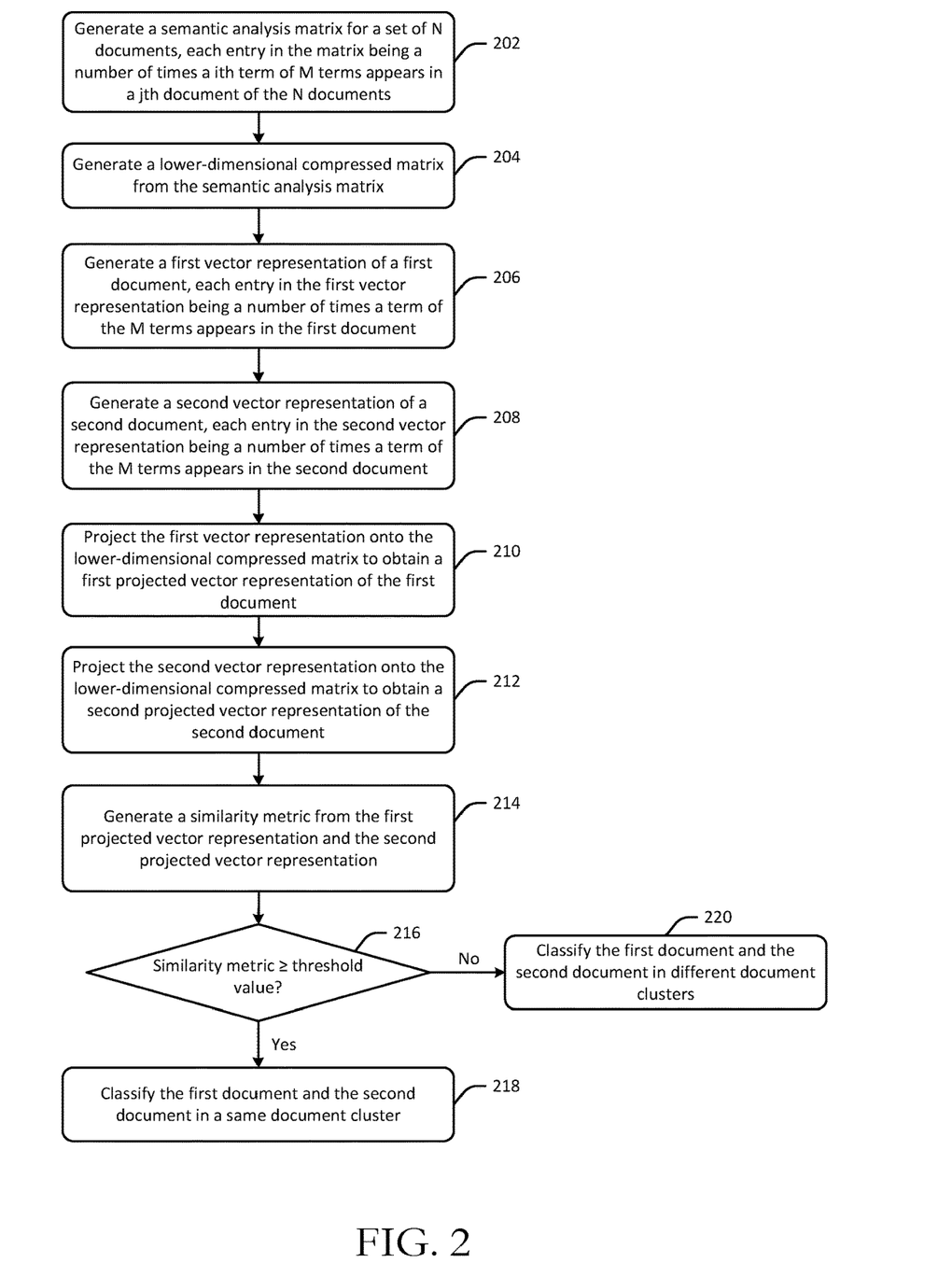
FIG. 2 is a process flow diagram of an illustrative method for performing semantic document analysis in accordance with one or more example embodiments of the disclosure.
Figure 3:
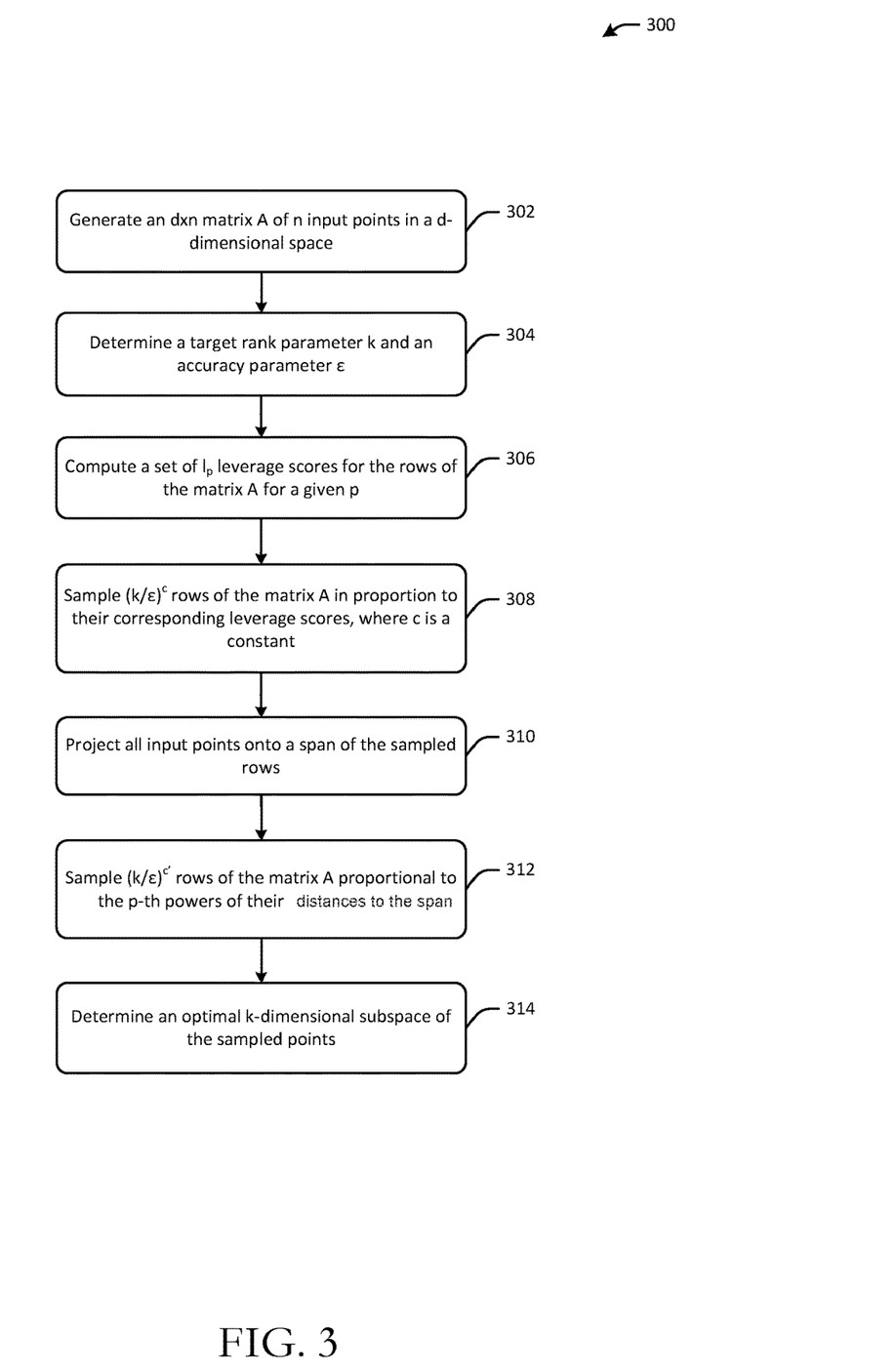
FIG. 3 is a process flow diagram of an illustrative method for determining a lower-dimensional representation of a set of input data points in accordance with one or more example embodiments of the disclosure.

As previously noted, a lower-dimensional dataset representation obtained in accordance with example embodiments of the disclosure can be used, for example, to perform semantic document analysis. FIG. 1 is a block diagram schematically depicting a semantic document analysis process in accordance with one or more example embodiments of the disclosure. FIG. 2 is a process flow diagram of an illustrative method for 200 performing semantic document analysis in accordance with one or more example embodiments of the disclosure. FIG. 3 is a process flow diagram of an illustrative method 300 for determining a lower-dimensional representation of a set of input data points in accordance with one or more example embodiments of the disclosure. In certain example embodiments, the method 300 of FIG. 3 may be performed as part of the method 200 of FIG. 2. FIGS. 1 and 2 will be described in conjunction with one another hereinafter.

Each operation of the method 200 and/or the method 300 may be performed by one or more of the program modules depicted in FIG. 1 or FIG. 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIG. 1 and FIG. 2 in conjunction with one another, at block 202 computer-executable instructions of one or more matrix generation modules 102 may be executed to generate a semantic analysis matrix 114 from a set of documents 112. A document 112 may be stored in any suitable format and may include, without limitation, online text, an electronic book (e-book), a portable document format (pdf) file, or the like. A document 112 may be a single paragraph or a collection of multiple paragraphs.

In certain example embodiments, the semantic analysis matrix 114 may be an n×m matrix, where each entry of the matrix is a value indicating a respective number of times a particular term among a set of m terms appears in a particular document among the set of n documents 112. Each term may be a single word or a sequence of multiple words. The terms may be preselected based on their impact on semantic meaning, and as such, certain words such as articles may be excluded.

At block 204, computer-executable instructions of one or more compressed matrix generation modules may be executed to generate a lower-dimensional compressed semantic analysis matrix 116 from the semantic analysis matrix 114. In example embodiments, the method 300 of FIG. 3 may be performed to generate the compressed semantic analysis matrix 116. The compressed semantic analysis matrix 116 may have a dimension k<n (the dimension of the original semantic analysis matrix 114). In certain example embodiments, the compressed semantic analysis matrix 116 may contain or otherwise embody a set of vectors $u_1, \ldots, u_k$ obtained by sampling rows of the semantic analysis matrix 114 in accordance with the method 300 of FIG. 3. The set of vectors obtained in accordance with example embodiments of the disclosure may satisfy a more robust error measure than a set of vectors obtained via conventional SVD techniques. In particular, the use of a set of vectors $u_1, \ldots, u_k$ obtained in accordance with example embodiments of the disclosure in connection with a latent semantic analysis application may yield improved performance over a conventional SVD when outliers are present in the dataset.

The compressed semantic analysis matrix 116 may be used in subsequent operations of the method 200 to determine the extent of similarity between two documents for the purposes of classifying the documents, for example. In particular, at block 206, computer-executable instructions of one or more vector generation modules 106 may be executed to generate a first vector representation $w=<WC_1, \ldots, WC_M>$ 122 of a first document 118. Each entry in the first vector representation w 122 may be a respective number of times a term in the set of m terms appears in the first document 118.

Similarly, at block 208, computer-executable instructions of the vector generation module(s) 106 may be executed to generate a second vector representation $z=<WC_1, \ldots, WC_M>$ 124 of a second document 120. Each entry in the second vector representation z 124 may be a respective number of times a term in the set of m terms appears in the second document 120.

At block 210, computer-executable instructions of one or more projected vector generation modules 108 may be executed to generate a first projected vector w' 126 from the first vector representation w 122. Similarly, at block 212, computer-executable instructions of the projected vector generation module(s) 108 may be executed to generate a second projected vector z' 128 from the second vector representation z 124. In certain example embodiments, the first projected vector w' 126 may be obtained through matrix multiplication of the k×m compressed semantic analysis matrix 116 and the m×1 first vector representation w 122. Similarly, the second projected vector z' 128 may be obtained through matrix multiplication of the compressed semantic analysis matrix 116 and the second vector representation z 124. As such, the first projected vector w' 126 and the second projected vector z' 128 may be k-dimensional, which is less than the dimension of the original semantic analysis matrix 114. Stated another way, the first projected vector w' 126 and the second projected vector z' 128 may be formed by projecting the first vector representation w 122 and the second vector representation z 124, respectively, onto a linear combination (also referred to herein as a span) of a set of vectors $u_1, \ldots, u_k$ constituting rows of the compressed semantic analysis matrix 116.

At block 214, computer-executable instructions of one or more semantic analysis modules 110 may be executed to determine a similarity metric 130 using the first projected vector w' 126 and the second projected vector z' 128. The similarity metric may be any suitable metric that provides a measure of the extent/degree of similarity between the first document 118 and the second document 120.

In certain example embodiments, the similarity metric may be a cosine similarity of the first projected vector w' 126 and the second projected vector z' 128. The cosine similarity for vectors w' 126, z' 128 may be given by the following formula: cosine similarity $(CS)=<w', z'>/(|w'||z'|)$, where $<w', z'>$ is the inner product of vectors w', z' and equals $\Sigma_{i=1}^{k} w'_i * z'_i$, and '*' denotes the multiplication of numbers. In addition, $|w'|$ and $|z'|$ may represent the norms (lengths) of vectors w' and z', respectively. For any given vector v, $|v|=(\Sigma_{i=1}^{k}(z'_i)^2)^{1/2}$. It should be appreciated that cosine similarity is merely an illustrative similarity metric that may be used and that other measures of similarity may be used as well.

At block 216, computer-executable instructions of the semantic analysis module(s) 110 may be executed to compare the similarity metric 130 to a threshold value α, which may be a parameter that is user-tunable. In certain example embodiments, the similarity metric 130 may satisfy α if the similarity metric 130 is ≥α. In other example embodiments, the similarity metric 130 may satisfy α if it is ≤α. In certain example embodiments, a smaller a may indicate a greater similarity tolerance. That is, a smaller a may permit greater deviation between documents determined to be similar, and as such, may increase the size of document clusters of similar documents.

In response to a positive determination at block 216 indicating that the similarity metric 130 satisfies the threshold value α, the first document 118 and the second document 120 may be deemed similar, and computer-executable instructions of the semantic analysis module(s) 110 may be executed at block 218 to classify the first document 118 and the second document 120 in the same document cluster. On the other hand, in response to a negative determination at block 216 indicating that the similarity metric 130 does not satisfy the threshold value α, the semantic analysis module(s) 110 may be executed at block 220 to classify the first document 118 and the second document 120 in different document clusters. Document clustering may be used, for example, to improve the targeting of content recommendations to users. For example, if a user has consumed the first document 118, the second document 120 may be recommended to the user if the first document 118 and the second document 120 are in the same document cluster.

In certain example embodiments, the set of vectors $u_1, \ldots, u_k$ constituting rows of the compressed semantic analysis matrix 116 may correspond to a subset of documents that is representative of the larger set of documents 112. The subset of documents may be indicative of one or more subject matter topics in the set of documents 112. As such, in certain example embodiments, the compressed semantic analysis matrix 116 may be used to identify subject matter topics that may be present in a document. For example, the first vector representation w 122 of the first document 118 may be multiplied via matrix multiplication with the compressed semantic analysis matrix 116 to obtain the first projected vector w' 126. This projection of the first vector representation w 122 of the first document 118 onto the set of vectors $u_1, \ldots, u_k$ to obtain the first projected vector w' 126 may be interpreted as a representation of the first document 118 as a linear combination of the subset of documents represented in the compressed semantic analysis matrix 115. As such, the first document 118 may be determined to contain one or more subject matter topics present in the subset of documents.

FIG. 3 is a process flow diagram of an illustrative method 300 for determining a lower-dimensional representation of a set of input data points in accordance with one or more example embodiments of the disclosure. In certain example embodiments, the method 300 may be performed by executing computer-executable instructions of the compressed matrix generation module(s) 104 to generate the compressed semantic analysis matrix 116.

At block 302, a d×n matrix (matrix A) may be generated that contains n input data points in a d-dimensional space. At block 304, a target rank parameter k and an accuracy parameter/tolerance £ may be determined. The target rank parameter k may be a desired dimension of a lower-dimensional representation of the original input matrix A. The accuracy tolerance £ may be tunable based on the desired error robustness. For example, assuming an optimal cost c associated with an optimal lower-dimensional representation of the original input matrix A, the accuracy tolerance £ may be chosen such that the cost associated with an acceptable lower-dimensional representation of the original input matrix A is no more than (1+ε) times the optimal cost.

At block 306, a set of $l_p$ leverage scores may be computed for the rows of the original input matrix A for a given value of p. Each leverage score may correspond to a particular row of the original input matrix A and may constitute a measure (e.g., a probabilistic measure) of a deviation between the input data points of that row and the input data points of other rows. For a value of p=1, the lower-dimensional representation obtained by the method 300 may support as robust an error measure as is desired via tuning of the accuracy tolerance ε and may mitigate the impact of outlier data points in the original input matrix A by minimizing the sum of distances of input data points of the original input matrix A to the lower-dimensional representation. For values of p≥2, the lower-dimensional representation may satisfy more stringent requirements with respect to outlier data points by minimizing the maximum distance between the input data points of the original input matrix A and the lower-dimensional representation.

At block 308, a first subset of rows of the original input matrix A may be sampled in proportion to their corresponding $l_p$ leverage scores. More specifically, in certain example embodiments, $(k/\varepsilon)^c$ rows of the original input matrix A may be sampled based on their corresponding leverage scores, where k is the target dimension of the lower-dimensional representation, £ is the accuracy tolerance, and c is a small constant. It should be appreciated that as the target rank parameter k increases, the accuracy tolerance ε decreases, or the constant c is increased, the number of rows sampled increases.

At block 310, all input points of the original input matrix A may be projected onto a span of the first subset of rows sampled at block 308. At block 310, a set of projections may be obtained, each projection being a projection of a row of the original input matrix A onto a linear combination of the sampled first subset of rows. If, for example, the linear combination is representable as a line, each projection may be a perpendicular from an input data point to the line.

At block 312, a second sampling of the rows of the original input matrix A may be performed. In particular, $(k/\varepsilon)^{c'}$ rows of the original input matrix A may be sampled in proportion to the p-th powers of their distances to the span of the sampled rows of the first subset in order to obtain a second subset of sampled rows. The constant c' may be larger or smaller than the constant c.

At block 314, an optimal k-dimensional subspace (e.g., the lower-dimensional representation of the original input matrix A) may be determined from the first subset of sampled rows and the second subset of sampled rows. The optimal k-dimensional subspace may be determined using any suitable heuristic, by setting up a polynomial system of inequalities (which is efficient for a constant k and c), or the like. In certain other example embodiments, a combined subset including the first subset and the second subset may be used as the lower-dimensional representation of the original input matrix A. As previously noted, for a p value=1, the lower-dimensional representation may be one that minimizes the sum of the distances from the input data points to the lower-dimensional representation. For p values ≥2, the lower-dimensional representation may be one that minimizes the maximum distance between an input data point and the lower-dimensional representation.

Example embodiments of the disclosure provide various technical features, technical effects, and/or improvements to technology. For instance, example embodiments of the disclosure provide the technical effect of improving the runtime performance for generating a lower-dimensional representation of an input dataset as compared to conventional SVD techniques. This technical effect is achieved at least in part by the technical features embodied in the steps of the method 300 of FIG. 3. A lower-dimensional representation generated in accordance with example embodiments of the disclosure also produces the technical effect of providing a robust error measure guarantee that satisfies a tunable accuracy tolerance £ and that mitigates the impact of outliers in the input dataset. A lower-dimensional representation generated in accordance with example embodiments of the disclosure additionally produces the technical effect of minimizing the maximum distance between input data points and the lower-dimensional representation, thereby improving the extent to which the lower-dimensional representation is representative of the input dataset for larger p values.

The above-mentioned technical effects individually and together constitute an improvement to computer technology by generating a lower-dimensional representation of an input dataset with improved performance (e.g., less processing time or processing capacity) as compared to conventional SVM techniques. Because of the reduced runtime required to generate a lower-dimensional representation in accordance with example embodiments of the disclosure, the impact of time constraints associated with heuristics or other algorithms that require the lower-dimensional representation to execute may be mitigated and improve output accuracy may be achieved. As such, example embodiments of the disclosure provide improvements to a variety of technological fields in which the lower-dimensional representation can be used including, for example, semantic document analysis, data storage, data de-noising, etc. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
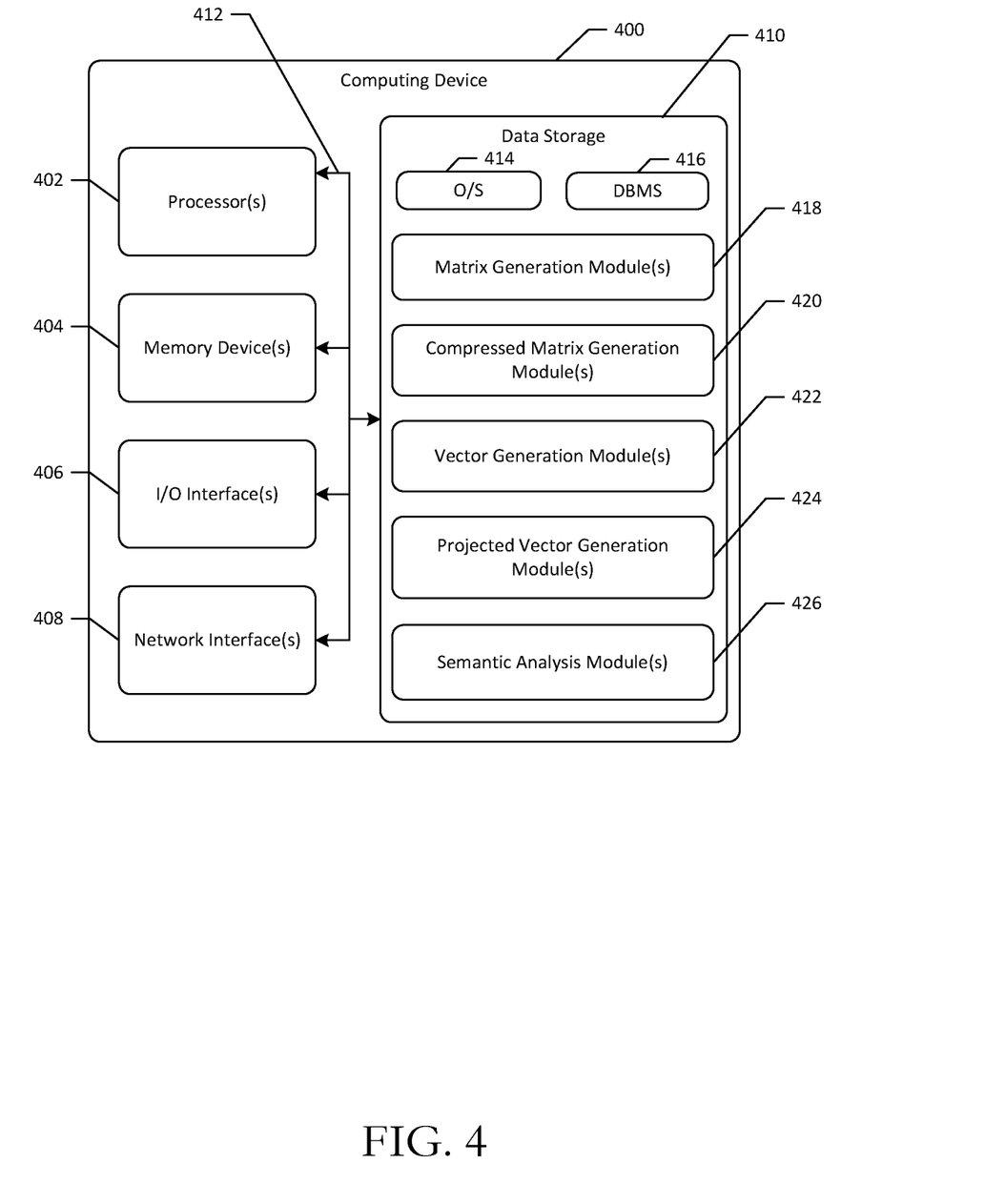
FIG. 4 is a schematic diagram of an illustrative computing device configured to implement one or more example embodiments of the disclosure.

FIG. 4 is a schematic diagram of an illustrative computing device 400 configured to implement one or more example embodiments of the disclosure. While the device 400 may be described herein in the singular, it should be appreciated that multiple instances of the device 400 may be provided, and functionality described in connection with the device 400 may be distributed across such multiple instances.

In an illustrative configuration, the device 400 may include one or more processors (processor(s)) 402, one or more memory devices 404 (generically referred to herein as memory 404), one or more input/output ("I/O") interface(s) 406, one or more network interfaces 408, and data storage 410. The device 400 may further include one or more buses 412 that functionally couple various components of the device 400.

The bus(es) 412 may include at least one of a system bus, a memory bus, an address bus, or a message bus, and may permit the exchange of information (e.g., data (including computer-executable code), signaling, etc.) between various components of the device 400. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 410 may include removable storage and/or non-removable storage including, but not limited to, magnetic storage, optical disk storage, and/or tape storage. The data storage 410 may provide non-volatile storage of computer-executable instructions and other data. The memory 404 and the data storage 410, removable and/or non-removable, are examples of computer-readable storage media (CRSM) as that term is used herein.

The data storage 410 may store computer-executable code, instructions, or the like that may be loadable into the memory 404 and executable by the processor(s) 402 to cause the processor(s) 402 to perform or initiate various operations. The data storage 410 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404 and may ultimately be copied to data storage 410 for non-volatile storage.

More specifically, the data storage 410 may store one or more operating systems (O/S) 414; one or more database management systems (DBMS) 416 configured to access the memory 404 and/or one or more external data store(s) (not shown); and one or more program modules, applications, engines, computer-executable code, scripts, or the like such as, for example, one or more matrix generation modules 418, one or more compressed matrix generation modules 420, one or more vector generation modules 422, one or more projected vector generation modules 424, and one or more semantic analysis modules 426. Any of these modules may, in turn, include various sub-modules. Any of the components depicted as being stored in data storage 410 may include any combination of software, firmware, and/or hardware. The software and/or firmware may include computer-executable instructions (e.g., computer-executable program code) that may be loaded into the memory 404 for execution by one or more of the processor(s) 402 to perform any of the operations described earlier in connection with correspondingly named modules.

Although not depicted in FIG. 4, the data storage 410 may further store various types of data utilized by components of the device 400 (e.g., vector representations of documents, entries of a semantic analysis matrix, leverage scores, distances of input data points to a lower-dimensional representation, entries of a compressed semantic analysis matrix constituting the lower-dimensional representation, etc.). Any data stored in the data storage 410 may be loaded into the memory 404 for use by the processor(s) 402 in executing computer-executable instructions. In addition, any data stored in the data storage 410 may potentially be stored in external data store(s) (not shown) and may be accessed via the DBMS 416 and loaded in the memory 404 for use by the processor(s) 402 in executing computer-executable instructions.

The processor(s) 402 may be configured to access the memory 404 and execute computer-executable instructions loaded therein. For example, the processor(s) 402 may be configured to execute computer-executable instructions of the various program modules, applications, engines, or the like of the device 400 to cause or facilitate various operations to be performed in accordance with one or more embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to other illustrative components depicted as being stored in the data storage 410, the O/S 414 may be loaded from the data storage 410 into the memory 404 and may provide an interface between other application software executing on the device 400 and hardware resources of the device 400. More specifically, the O/S 414 may include a set of computer-executable instructions for managing hardware resources of the device 400 and for providing common services to other application programs. In certain example embodiments, the O/S 414 may include or otherwise control execution of one or more of the program modules depicted as being stored in the data storage 410. The O/S 414 may include any operating system now known or which may be developed in the future including, but not limited to, any server operating system, any mainframe operating system, or any other proprietary or non-proprietary operating system.

The DBMS 416 may be loaded into the memory 404 and may support functionality for accessing, retrieving, storing, and/or manipulating data stored in the memory 404, data stored in the data storage 410, and/or data stored in external data store(s). The DBMS 416 may use any of a variety of database models (e.g., relational model, object model, etc.) and may support any of a variety of query languages. The DBMS 416 may access data represented in one or more data schemas and stored in any suitable data repository. External data store(s) that may be accessible by the device 400 via the DBMS 416 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the device 400, the input/output (I/O) interface(s) 406 may facilitate the receipt of input information by the device 400 from one or more I/O devices as well as the output of information from the device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 400 may further include one or more network interfaces 408 via which the device 400 may communicate with any of a variety of other systems, platforms, networks, devices, and so forth. The network interface(s) 408 may enable communication, for example, with one or more other devices via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules depicted in FIG. 4 as being stored in the data storage 410 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the device 400 and/or hosted on other computing device(s) accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of devices 400 in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the device 400 may include alternate and/or additional hardware, software, or firmware components beyond those described or depicted without departing from the scope of the disclosure. More particularly, it should be appreciated that software, firmware, or hardware components depicted as forming part of the device 400 are merely illustrative and that some components may not be present or additional components may be provided in various embodiments. While various illustrative modules have been depicted and described as software modules stored in data storage 410, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 and/or the method 300 may be performed by a device 400 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method 200 of FIG. 2 and/or the illustrative method 300 of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 and/or FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing semantic document analysis, the method comprising:
   determining a semantic analysis matrix corresponding to a set of documents, wherein each entry of the semantic analysis matrix indicates a number of times a respective term of a set of terms appears in a corresponding document in the set of documents;
   determining a lower-dimensional compressed matrix from the semantic analysis matrix, wherein the lower-dimensional compressed matrix corresponds to a document subset of the set of documents that is representative of the set of documents within an accuracy tolerance;
   determining a first vector representation of a first document and a second vector representation of a second document;
   determining a first lower-dimensional vector representation of the first document using the first vector representation and the lower-dimensional compressed matrix and a second lower-dimensional vector representation of the second document using the second vector representation and the lower-dimensional compressed matrix;
   determining, using the first lower-dimensional vector representation and the second lower-dimensional vector representation, a similarity metric associated with the first document and the second document;
   determining that the similarity metric satisfies a threshold value; and
   classifying the first document and the second document in a same document cluster.

2. The computer-implemented method of claim 1, wherein determining the lower-dimensional compressed matrix comprises:
   determining a set of leverage scores corresponding to rows of the semantic analysis matrix; and
   sampling a subset of the rows of the semantic analysis matrix based at least in part on a corresponding subset of the set of leverage scores.

3. The computer-implemented method of claim 2, wherein determining the lower-dimensional compressed matrix further comprises:
   determining a target rank parameter;
   determining the accuracy tolerance;
   determining, based at least in part on the target rank parameter and the accuracy tolerance, a number of times to sample the semantic analysis matrix to obtain the subset of rows.

4. The computer-implemented method of claim 3, wherein determining the lower-dimensional compressed matrix further comprises projecting each of the rows of the semantic analysis matrix onto a linear combination of the sampled subset of rows.

5. The computer-implemented method of claim 4, wherein the number of times to sample the semantic analysis matrix is a first number of times and the subset is a first subset, and wherein determining the lower-dimensional compressed matrix further comprises:
   determining a set of distances from the rows of the semantic analysis matrix to the linear combination based at least in part on the projecting;
   determining, based at least in part on the target rank parameter, the accuracy tolerance, and the set of distances, a second number of times to sample the semantic analysis matrix to obtain the subset of rows;
   sampling the rows of the semantic analysis matrix the second number of times to obtain a second subset of the rows of the semantic analysis matrix; and
   generating the lower-dimensional compressed matrix using at least a portion of a combined subset of the rows of the semantic analysis matrix, the combined subset containing the first subset and the second subset.

6. The computer-implemented method of claim 5, wherein determining the lower-dimensional compressed matrix further comprises determining an optimal subspace of the combined subset, wherein a number of dimensions of the optimal subspace is the target rank parameter.

7. The computer-implemented method of claim 1, wherein the set of terms is selected based at least in part on a predefined impact on semantic meaning.

8. A system for performing semantic document analysis, the system comprising:
   at least one memory storing computer-executable instructions; and
   at least one processor configured to access the at least one memory and execute the computer-executable instructions to:
   determine a semantic analysis matrix corresponding to a set of documents, wherein each entry of the semantic analysis matrix indicates a number of times a respective term of a set of terms appears in a corresponding document in the set of documents;
   determine a lower-dimensional compressed matrix from the semantic analysis matrix, wherein the lower-dimensional compressed matrix corresponds to a document subset of the set of documents that is representative of the set of documents within an accuracy tolerance;
   determine a first vector representation of a first document and a second vector representation of a second document;
   determine a first lower-dimensional vector representation of the first document using the first vector representation and the lower-dimensional compressed matrix and a second lower-dimensional vector representation of the second document using the second vector representation and the lower-dimensional compressed matrix;
determine, using the first lower-dimensional vector representation and the second lower-dimensional vector representation, a similarity metric associated with the first document and the second document;
determine that the similarity metric satisfies a threshold value; and
classify the first document and the second document in a same document cluster.

9. The system of claim 8, wherein the at least one processor is configured to determine the lower-dimensional compressed matrix by executing the computer-executable instructions to:
determine a set of leverage scores corresponding to rows of the semantic analysis matrix; and
sample a subset of the rows of the semantic analysis matrix based at least in part on a corresponding subset of the set of leverage scores.

10. The system of claim 9, wherein the at least one processor is further configured to determine the lower-dimensional compressed matrix by executing the computer-executable instructions to:
determine a target rank parameter;
determine the accuracy tolerance;
determine, based at least in part on the target rank parameter and the accuracy tolerance, a number of times to sample the semantic analysis matrix to obtain the subset of rows.

11. The system of claim 10, wherein the at least one processor is further configured to determine the lower-dimensional compressed matrix by executing the computer-executable instructions to project each of the rows of the semantic analysis matrix onto a linear combination of the sampled subset of rows.

12. The system of claim 11, wherein the number of times to sample the semantic analysis matrix is a first number of times and the subset is a first subset, and wherein the at least one processor is further configured to determine the lower-dimensional compressed matrix by executing the computer-executable instructions to:
determine a set of distances from the rows of the semantic analysis matrix to the linear combination based at least in part on the projecting;
determine, based at least in part on the target rank parameter, the accuracy tolerance, and the set of distances, a second number of times to sample the semantic analysis matrix to obtain the subset of rows;
sample the rows of the semantic analysis matrix the second number of times to obtain a second subset of the rows of the semantic analysis matrix; and
generate the lower-dimensional compressed matrix using at least a portion of a combined subset of the rows of the semantic analysis matrix, the combined subset containing the first subset and the second subset.

13. The system of claim 12, wherein the at least one processor is further configured to determine the lower-dimensional compressed matrix by executing the computer-executable instructions to determine an optimal subspace of the combined subset, wherein a number of dimensions of the optimal subspace is the target rank parameter.

14. The system of claim 8, wherein the set of terms is selected based at least in part on a predefined impact on semantic meaning.

15. A computer program product for performing semantic document analysis, the computer program product comprising a storage medium readable by a processing circuit, the storage medium storing instructions executable by the processing circuit to cause a method to be performed, the method comprising:
determining a semantic analysis matrix corresponding to a set of documents, wherein each entry of the semantic analysis matrix indicates a number of times a respective term of a set of terms appears in a corresponding document in the set of documents;
determining a lower-dimensional compressed matrix from the semantic analysis matrix, wherein the lower-dimensional compressed matrix corresponds to a document subset of the set of documents that is representative of the set of documents within an accuracy tolerance;
determining a first vector representation of a first document and a second vector representation of a second document;
determining a first lower-dimensional vector representation of the first document using the first vector representation and the lower-dimensional compressed matrix and a second lower-dimensional vector representation of the second document using the second vector representation and the lower-dimensional compressed matrix;
determining, using the first lower-dimensional vector representation and the second lower-dimensional vector representation, a similarity metric associated with the first document and the second document;
determining that the similarity metric satisfies a threshold value; and
classifying the first document and the second document in a same document cluster.

16. The computer program product of claim 15, wherein determining the lower-dimensional compressed matrix comprises:
determining a set of leverage scores corresponding to rows of the semantic analysis matrix; and
sampling a subset of the rows of the semantic analysis matrix based at least in part on a corresponding subset of the set of leverage scores.

17. The computer program product of claim 16, wherein determining the lower-dimensional compressed matrix further comprises:
determining a target rank parameter;
determining an accuracy tolerance;
determining, based at least in part on the target rank parameter and the accuracy tolerance, a number of times to sample the semantic analysis matrix to obtain the subset of rows.

18. The computer program product of claim 17, wherein determining the lower-dimensional compressed matrix further comprises projecting each of the rows of the semantic analysis matrix onto a linear combination of the sampled subset of rows.

19. The computer program product of claim 18, wherein the number of times to sample the semantic analysis matrix is a first number of times and the subset is a first subset, and wherein determining the lower-dimensional compressed matrix further comprises:
determining a set of distances from the rows of the semantic analysis matrix to the linear combination based at least in part on the projecting;
determining, based at least in part on the target rank parameter, the accuracy tolerance, and the set of distances, a second number of times to sample the semantic analysis matrix to obtain the subset of rows;

sampling the rows of the semantic analysis matrix the second number of times to obtain a second subset of the rows of the semantic analysis matrix; and generating the lower-dimensional compressed matrix using at least a portion of a combined subset of the rows of the semantic analysis matrix, the combined subset containing the first subset and the second subset.

20. The computer program product of claim 19, wherein determining the lower-dimensional compressed matrix further comprises determining an optimal subspace of the combined subset, wherein a number of dimensions of the optimal subspace is the target rank parameter.

* * * * *